United States Patent
Kim

(10) Patent No.: US 10,025,405 B2
(45) Date of Patent: Jul. 17, 2018

(54) MOBILE TERMINAL AND CONTROL METHOD FOR LINKING INFORMATION WITH A MEMO

(71) Applicant: LG ELECTRONICS INC., Seoul (KR)

(72) Inventor: Taeho Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 193 days.

(21) Appl. No.: 14/067,781

(22) Filed: Oct. 30, 2013

(65) Prior Publication Data

US 2014/0132535 A1 May 15, 2014

(30) Foreign Application Priority Data

Nov. 12, 2012 (KR) .................. 10-2012-0127207

(51) Int. Cl.
*G06F 3/041* (2006.01)
*G06F 3/0488* (2013.01)

(52) U.S. Cl.
CPC .......... *G06F 3/041* (2013.01); *G06F 3/04883* (2013.01)

(58) Field of Classification Search
CPC ........ G06F 3/041; G06F 3/0412; G06F 3/044; G06F 3/0481; G06F 3/04817; G06F 3/0482
USPC .................................................. 345/173–179
See application file for complete search history.

(56) References Cited

U.S. PATENT DOCUMENTS 6,396,481 B1 * 5/2002 Challa et al. ................. 345/169
7,894,836 B1 * 2/2011 Fuoss et al. .................. 455/466
8,797,293 B2 * 8/2014 Kim ..................... G06F 3/04886
    345/173
2005/0183026 A1 8/2005 Amano et al.
2006/0114239 A1 * 6/2006 Nakajima ........... G06F 3/04883
    345/173
2008/0090609 A1 * 4/2008 Walter .................. H04M 1/247
    455/556.2
2008/0174568 A1 * 7/2008 Kim ..................... G06F 3/04886
    345/173

(Continued)

FOREIGN PATENT DOCUMENTS

CN 101242602 8/2008
CN 102282554 12/2011
CN 102404447 4/2012

OTHER PUBLICATIONS

The State Intellectual Property Office of the People's Republic of China Application Serial No. 201310560008.9, Office Action dated Jul. 13, 2016, 31 pages.

(Continued)

*Primary Examiner* — Alexander Eisen
*Assistant Examiner* — Nelson Lam
(74) *Attorney, Agent, or Firm* — Lee, Hong, Degerman, Kang & Waimey PC

(57) ABSTRACT

A mobile terminal and a control method thereof are provided. A mobile terminal according to an embodiment of the present invention generates a memo corresponding to a captured image in a memo mode, displays an item group including at least one item on a touchscreen in a memo mode, links at least one item of the item group with a generated memo and stores the item linked with the memo. Accordingly, utilization of a memo is improved by linking the memo with an item executable in the mobile terminal.

11 Claims, 20 Drawing Sheets

(56) References Cited

U.S. PATENT DOCUMENTS

| | | | |
|---|---|---|---|
| 2009/0244023 A1* | 10/2009 | Kim et al. | 345/173 |
| 2009/0271486 A1* | 10/2009 | Ligh et al. | 709/206 |
| 2010/0131880 A1* | 5/2010 | Lee ................ G06F 3/04817 | 715/769 |
| 2010/0315358 A1* | 12/2010 | Chang ............. G06F 3/04883 | 345/173 |
| 2011/0111775 A1* | 5/2011 | Kim et al. | 455/466 |
| 2012/0064947 A1* | 3/2012 | Yi .................... G06F 3/0483 | 455/566 |
| 2012/0174009 A1 | 7/2012 | Kwon | |
| 2012/0302167 A1* | 11/2012 | Yun et al. | 455/41.2 |
| 2013/0050141 A1* | 2/2013 | Park et al. | 345/174 |
| 2013/0072262 A1* | 3/2013 | Mhun ............. H04M 1/72552 | 455/566 |
| 2013/0321314 A1* | 12/2013 | Oh .................... G06F 3/041 | 345/173 |
| 2013/0331152 A1* | 12/2013 | Park ................. G06F 3/0481 | 455/566 |
| 2014/0002384 A1* | 1/2014 | Li ........................ G06F 3/03 | 345/173 |
| 2014/0015782 A1* | 1/2014 | Kim et al. | 345/173 |
| 2014/0125606 A1* | 5/2014 | Namkung | 345/173 |
| 2014/0253779 A1* | 9/2014 | Park ................. G06F 3/0481 | 348/333.11 |
| 2015/0116251 A1* | 4/2015 | Yun ................. G06F 3/04883 | 345/173 |
| 2015/0128092 A1* | 5/2015 | Lee ................. H04M 1/72544 | 715/841 |
| 2017/0003868 A1* | 1/2017 | Oh .................... G06F 3/041 | |

OTHER PUBLICATIONS

European Patent Office Application Serial No. 13191691.8, Search Report dated Oct. 18, 2017, 8 pages.

* cited by examiner

FIG. 17

| A | B | | C |
|---|---|---|---|
| 25th day of every month | money for mother | [+][−][x] | 300,000 |
| 25th day of every mon | | | 100,000 |
| 25th day of every mon | C | ⌫ X | 100,000 |
| 25th day of every mon | 7 8 9 ÷ | Insurance Kim Taeho | 197,980 |
| 25th day of every mon | 4 5 6 * | | |
| 25th day of every mon | 1 2 3 − | Insurance Park Junghee | 39,780 |
| | . 0 = + | | |
| 25th day of every month | Gyobo health insurance Kim Taeho | | 35,870 |

MOBILE TERMINAL AND CONTROL METHOD FOR LINKING INFORMATION WITH A MEMO

CROSS-REFERENCE TO RELATED APPLICATIONS

Pursuant to 35 U.S.C. § 119(a), this application claims the benefit of earlier filing date and right of priority to Korean Patent Application No. 10-2012-0127207, filed on 12 Nov. 2012, the contents of which are incorporated by reference herein in its entirety.

BACKGROUND

Field of the Invention

The present invention relates to a mobile terminal and a control method thereof, and more particularly, to a mobile terminal and a control method thereof to improve utilization of a memo generated in a memo mode.

Discussion of the Related Art

As functions of terminals such as personal computers, laptop computers, cellular phones diversify, the terminals become multimedia players having multiple functions for capturing pictures or moving images, playing music, moving image files, games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable. As various terminals including a mobile terminal provide complicated and various functions, a menu structure also becomes complicated.

SUMMARY

Accordingly, the present invention is directed to a mobile terminal and a control method thereof to improve utilization of a memo generated in a memo mode by storing the memo in connection with at least one item that substantially obviates one or more problems due to limitations and disadvantages of the related art.

It is to be understood that both the foregoing general description and the following detailed description of the present invention are exemplary and explanatory and are intended to provide further explanation of the invention as claimed.

A mobile terminal according to one embodiment of the present invention includes a touchscreen, and a controller configured to capture an image displayed on the touchscreen, to enter a memo mode in which handwriting input is applicable to the captured image, to generate a memo corresponding to the captured image in the memo mode, to display an item group including at least one item on the touchscreen upon reception of a predetermined touch input in the memo mode, and to link at least one item of the item group with the generated memo corresponding to the captured image and store the item linked with the memo.

The predetermined touch input may include a sliding input starting at the edge of the touchscreen, and the controller may display the item group along the path of the sliding input on the touchscreen in a sliding manner.

The mobile terminal may further include a memory, wherein the item group includes at least one of an item group added by a user from among at least one item group downloaded from an external server and stored in the memory, an item group stored in the memory in an initial state, and a control item group for controlling operations of the mobile terminal.

The controller may link the at least one item with the generated memo upon reception of an input for dragging the at least one item to the memo.

The controller may display the memo and the linked item upon execution of the memo linking with the item and execute the item while the memo is displayed upon selection of the item.

The controller may execute the item in connection with the memo.

The item may include at least one item corresponding to map, messenger, calendar, calculator, music file, call functions, a wireless Internet setting function and a function of recommending an item added to the memo.

According to another embodiment of the present invention, a mobile terminal includes a radio frequency communication unit, a touchscreen, and a controller configured to receive a memo file linked with at least one item through the RF communication unit, to display a memo corresponding to the memo file and the at least one item linked with the memo on the touchscreen upon execution of the memo file, and to execute a specific item of the at least one item in connection with the memo in response to a receipt of an input selecting the specific item.

According to another embodiment of the present invention, a method of controlling a mobile terminal includes: capturing an image displayed on a touchscreen and entering a memo mode in which handwriting input is applicable to the captured image; receiving a sliding input starting at the edge of the touchscreen in the memo mode; displaying an item group including at least one item along the path of the sliding input on the touchscreen in a sliding manner; receiving an input for dragging a specific item to a memo corresponding to the captured image; and linking the dragged item with the memo and storing the specific item linked with the memo.

According to another embodiment of the present invention, a method of controlling a mobile terminal includes: receiving a memo file linked with at least one item through an RF communication unit; displaying a memo corresponding to the memo file and the item linked with the memo on the touchscreen upon execution of the memo file; and executing the item in connection with the memo in response to a receipt of an input selecting the item.

According to an embodiment the present invention, at least one item for controlling an operation of the mobile terminal can be linked with a generated memo and stored in a mode for generating a memo.

Furthermore, when the stored memo is executed, the linked item can be executed with the memo.

In addition, the linked item can be executed based on the memo.

Moreover, the stored memo can be shared with a counterpart mobile terminal such that the counterpart mobile terminal can execute the linked item by executing the shared memo.

In addition, utilization of the memo can be improved by linking the item with the memo.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 17 is a view illustrating an operation of the mobile terminal when a calculator application is linked with a memo;

DETAILED DESCRIPTION OF THE INVENTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
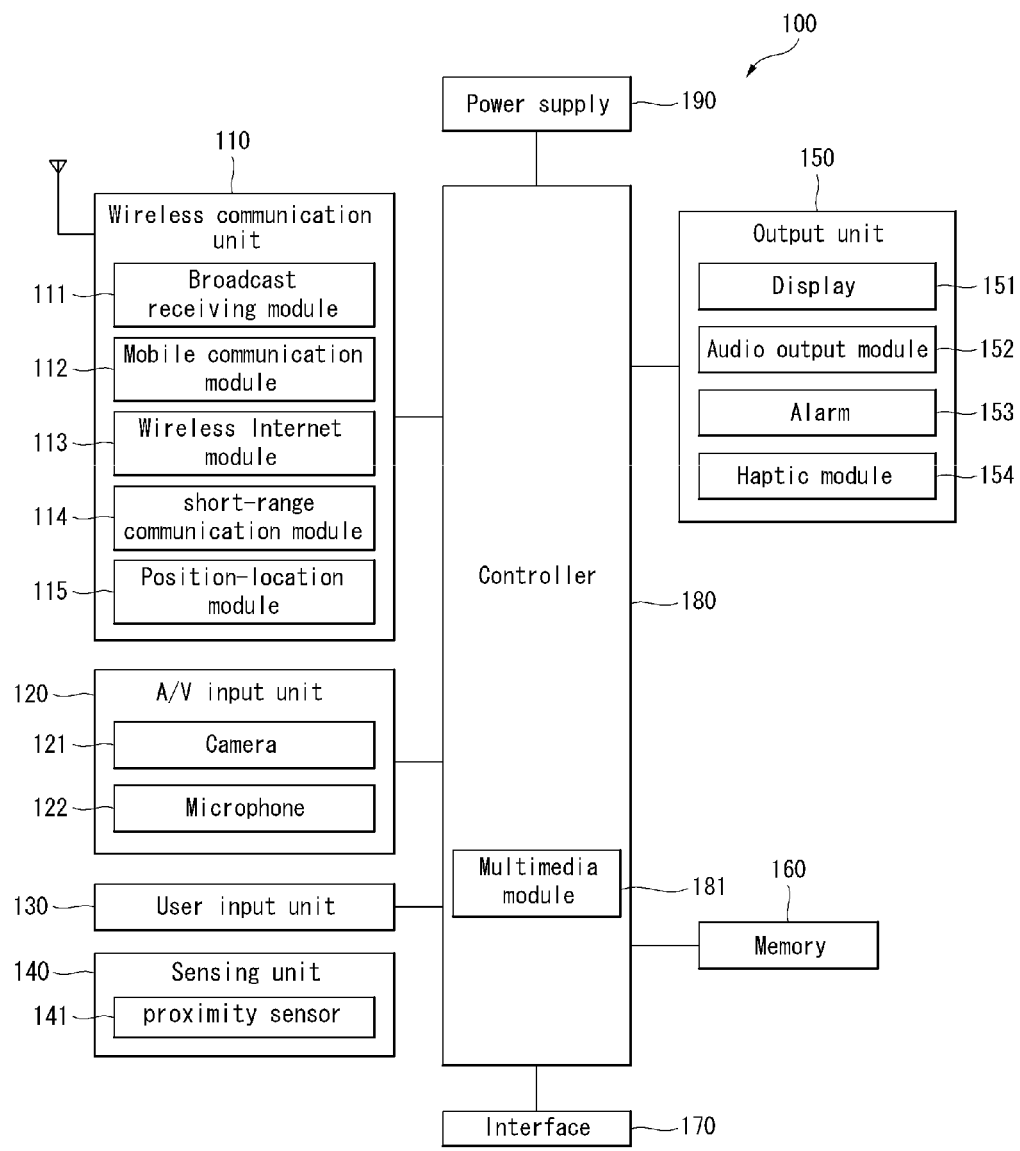
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position location module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (WIBRO), world interoperability for microwave access (WIMAX), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include a display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides of the mobile terminal.

When the display 151 and a touch sensing sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the mobile terminal 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152 respectively.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including mimicking an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picturedrawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Embodiments of the present invention will now be described.

It is assumed that the display module 151 is a touchscreen for convenience of description. As described above, the touchscreen 151 can perform both the information display function and information input function. However, the present invention is not limited thereto.

For the purpose of this discussion, a touch gesture shell mean a gesture corresponding to a contact touch or a proximity touch applied to the touchscreen 151, and touch input shall mean an input received by a touch gesture.

Touch gestures may include tapping, dragging, flicking, pressing, multi-touch, pinch-in, pinch-out, etc.

Tapping refers to a motion of slightly pressing the touchscreen 151 and releasing the touch and corresponds to a gesture such as clicking of a mouse of a computer.

Dragging refers to is a motion of touching the touchscreen 151, moving the touch to a specific point and releasing the touch. When an object is dragged, the object may be moved and displayed in the drag direction.

Flicking refers to a motion of touching the touchscreen 151, moving the touch in a specific direction (up, down, left, right, or diagonal direction) and then releasing the touch. Upon reception of touch input by flicking, the mobile terminal 100 processes a specific operation on the basis of a flicking direction, speed, etc. For example, the mobile terminal 100 can perform an operation of turning over the pages of e-book on the basis of a flicking direction.

Pressing refers to a motion of touching the touchscreen 151 and then maintaining the touch for a predetermined time or longer.

Multi-touch refers to a motion of simultaneously touching a plurality of points of the touchscreen 151.

Pinch-in refers to a motion of dragging a plurality of pointers that are multi-touching the touchscreen 151 to a direction in which the pointers become closer to one another. Thus, pinch-in includes a dragging touch started from at least one of the multi-touched points and generated in a direction in which the points become closer to one another.

Pinch-out refers to a motion of dragging a plurality of pointers that are multi-touching the touchscreen 151 to a direction in which the pointers become further apart from one another. Thus, pinch-out includes a dragging touch started from at least one of multi-touched points and generated in a direction in which the points become further apart from one another.

Figure 2:
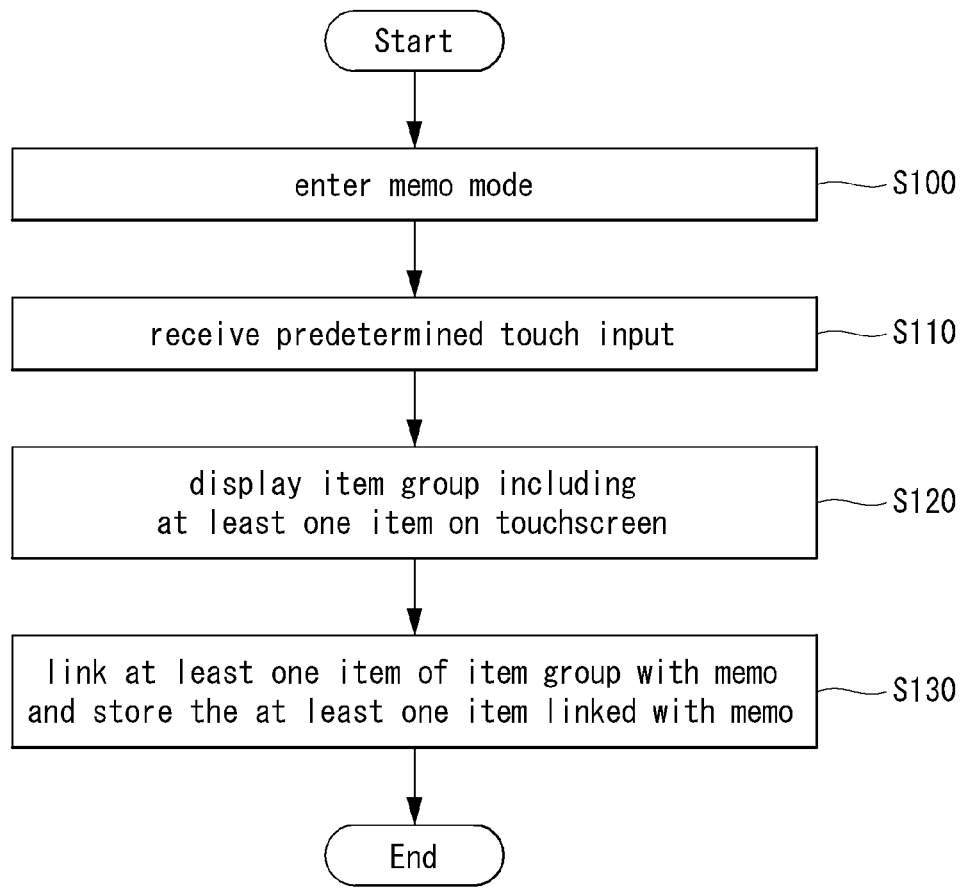
FIG. 2 is a flowchart illustrating a method of controlling a mobile terminal according to a first embodiment of the present invention.

FIG. 2 is a flowchart illustrating a method of controlling the mobile terminal according to a first embodiment of the present invention and FIGS. 3 to 8 are views illustrating the method of controlling the mobile terminal according to the first embodiment of the present invention. The method of controlling the mobile terminal can be implemented under the control of the controller 180 of the mobile terminal 100.

Referring to FIG. 2, the controller 180 of the mobile terminal 100 can enter a memo mode (S100).

Figure 3:
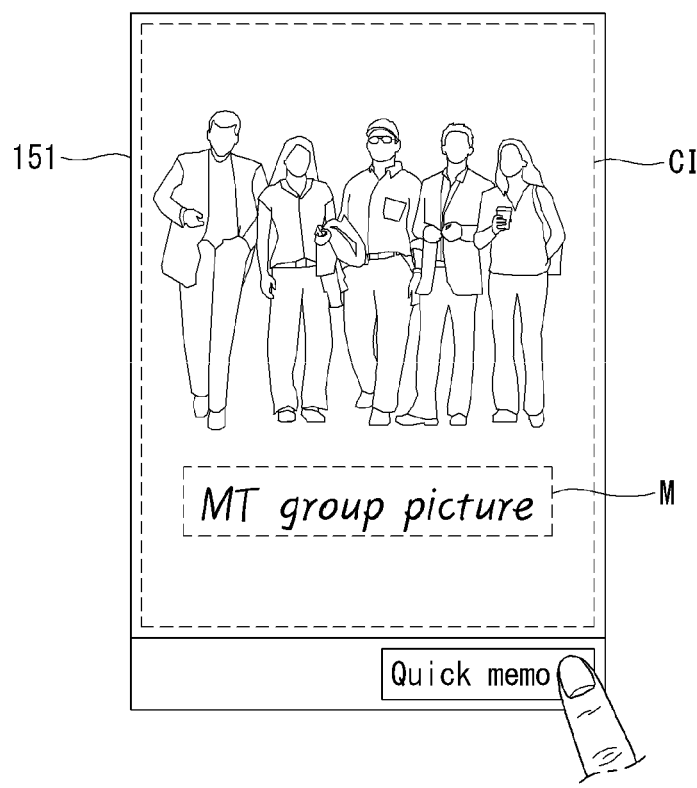
FIGS. 3 to 8 are views illustrating the method of controlling a mobile terminal according to the first embodiment of the present invention.

FIG. 3 is a view illustrating step S100 in more detail. Referring to FIG. 3, the controller 180 can enter the memo mode upon reception of a predetermined input. The predetermined input may include an input applied to a hard key included in the body (not shown) of the mobile terminal 100 or a soft key included in a specific area of the touchscreen 151. The predetermined input used to enter the memo mode is not limited thereto.

The controller 180 can enter the memo mode by capturing an image currently displayed on the touchscreen 151 and displaying the captured image CI on the touchscreen 151. That is, a user can write a memo on the captured image in a handwriting input form M.

The controller 180 can display a layer for receiving handwriting input of the user on the touchscreen 151 and recognize handwriting input of the user, applied to the layer, as a memo in the memo mode.

In the memo mode, the overall area of the touchscreen 151 can be set as an area for receiving handwriting input of the user.

The controller 180 can recognize the captured image CI displayed on the touchscreen 151 as a memo in the memo mode, as described above. Accordingly, the captured image CI may be an image displayed on the touchscreen 151 immediately before the mobile terminal 100 enters the memo mode. Therefore, handwriting input M applied to an execution screen of a specific item or application can be recognized as a memo of the user.

Referring to FIG. 2, upon reception of a predetermined touch input in the memo mode (S110), the controller 180 can display an item group including at least one item on the touchscreen 151 (S120).

Figure 4:
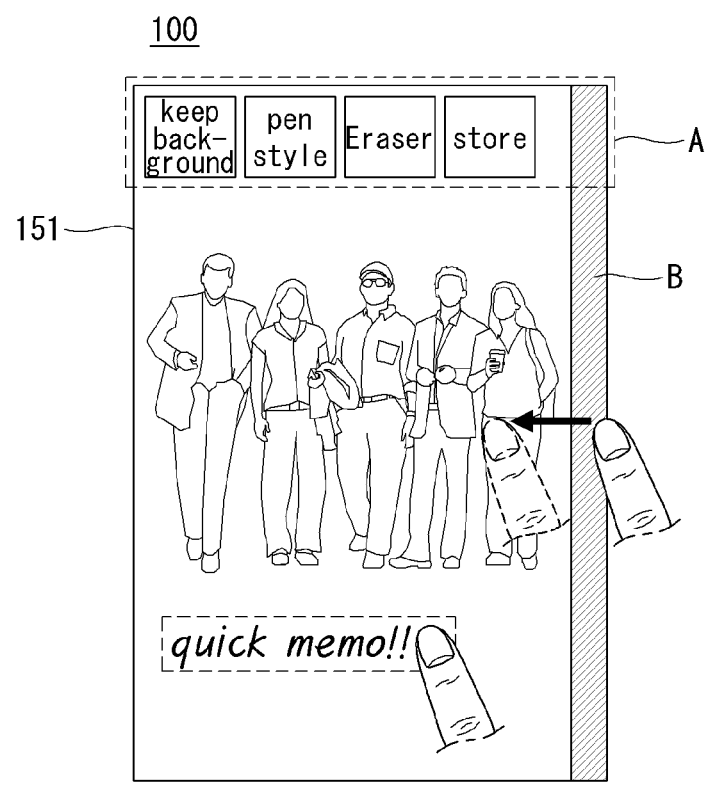
Figure 5:
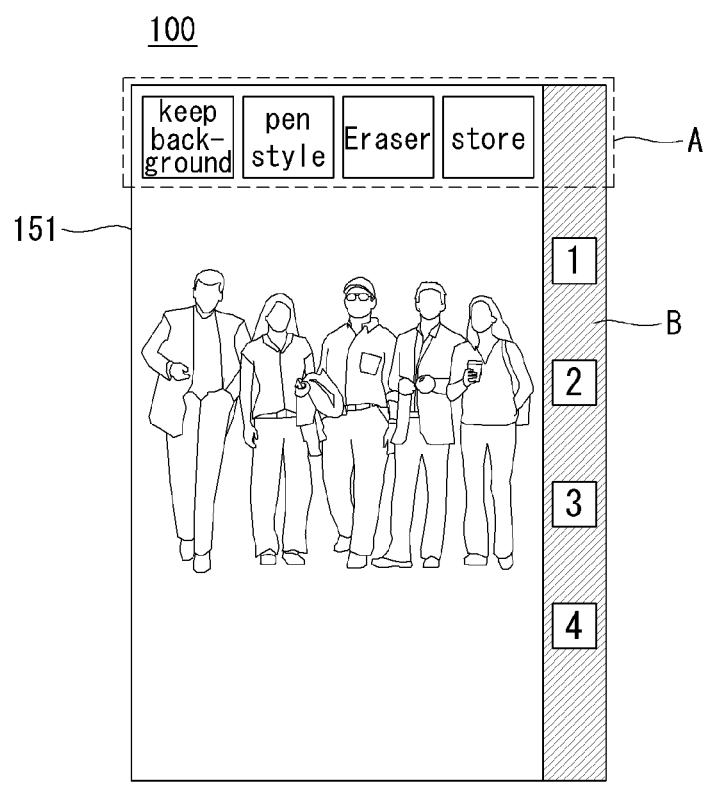

FIGS. 4 and 5 are views illustrating steps S110 and S120 in more detail.

Referring to FIGS. 4 and 5, the predetermined touch input may include a sliding input starting at the edge of the touchscreen 151. The controller 180 can display the item group on the touchscreen 151 along the path of the sliding input in a sliding manner.

The item group may be included in a layer B having a predetermined size and displayed in a sliding manner. The layer B having a predetermined size can be displayed in a sliding manner on the touchscreen 151 upon reception of the sliding input. The layer B may have a length corresponding to the vertical length of the touchscreen 151. Accordingly, when an input sliding from the vertical edge of the touchscreen 151 to the center of the touchscreen 151 is received, the layer B can be displayed on the touchscreen 151 according to the sliding input.

While the predetermined touch input is described as a sliding input, the present invention is not limited thereto and the predetermined touch input can include any touch input that enables the item group to be displayed on a memo screen.

In FIGS. 4 and 5, A denotes an area in which function icons corresponding to a pattern, shape, characteristic, storage, deletion, etc. of handwriting input of the user are displayed.

A description will be given of a process for linking the item group and a specific item of the item group with a memo with reference to FIGS. 5 to 8.

Referring to FIG. 5, the item group includes a first item group 1, a second item group 2, a third item group 3 and a fourth item group 4. The controller 180 can display an identification icon corresponding to the first item group 1 on the layer B. In addition, the controller 180 can display an identification icon corresponding to each of the item groups 2, 3 and 4 on the layer B.

The controller 180 can control the layer B to disappear from the touchscreen 151 upon reception of a second input in a direction opposite to the first sliding input.

Furthermore, the controller 180 may increase the size of the layer B when the number of item groups included in the layer B is greater than the number of item groups shown in FIG. 5.

The method of displaying the layer B on the touchscreen 151 is not limited to the above-described embodiment and display of the layer B can be controlled in various manners. For example, the layer B can be controlled to be displayed on the touchscreen 151 through voice input during the memo mode. If an object displayed on a memo screen is long pressed in the memo mode, the layer B including at least one item that can be linked with the object can be slid and displayed on the touchscreen 151.

Figure 6:
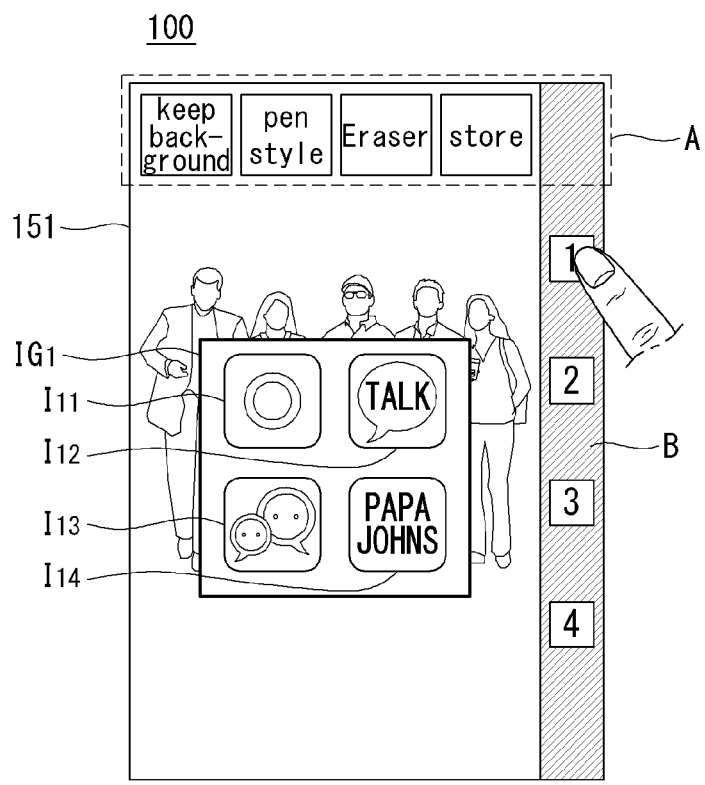

A description will be given of types of items included in the layer B with reference to FIGS. 6, 7 and 8.

The item group can be classified into a plurality of categories according to predetermined classification standard. For example, the first item group 1 includes an item selected by the user from at least one downloaded item, as shown in FIG. 6. For example, the first item group 1 can include an SNS application downloaded from an external server.

The controller 180 can display a pop-up window IG1 of the first item group on the touchscreen 151 upon reception of an input for selecting the first item group 1 displayed on the layer B. The pop-up window IG1 of the first item group may include a plurality of items 111, 112, 113 and 114.

Upon reception of an input for selecting one of the plurality of items 111, 112, 113 and 114, the controller 180 can link the selected item with a memo and store the item linked with the memo.

The plurality of items 111, 112, 113 and 114 included in the first item group 1 may include items directly downloaded from the external server by the user. Otherwise, items that the user wants to link with a memo in the memo mode, from among items stored in the memory (160 of FIG. 1), may be selected and grouped as the first item group 1.

Figure 7:
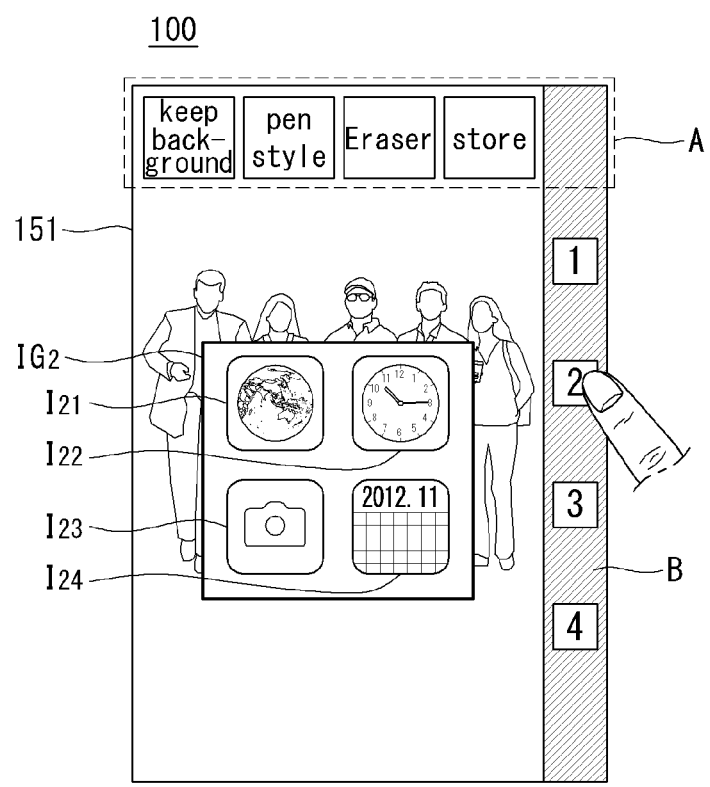

Referring to FIG. 7, the second item group 2 may include basic applications preinstalled in the memory (160 of FIG. 1) of the mobile terminal 100. As illustrated in FIG. 6, the controller 180 can display a pop-up window IG2 of the second item group 2 and a plurality of items 121, 122, 123 and 124 included in the pop-up window IG2 on the touchscreen 151. Upon selection of at least one of the plurality of items 121, 122, 123 and 124, the controller 180 can link the selected item with a memo and store the item linked with the memo.

Figure 8:
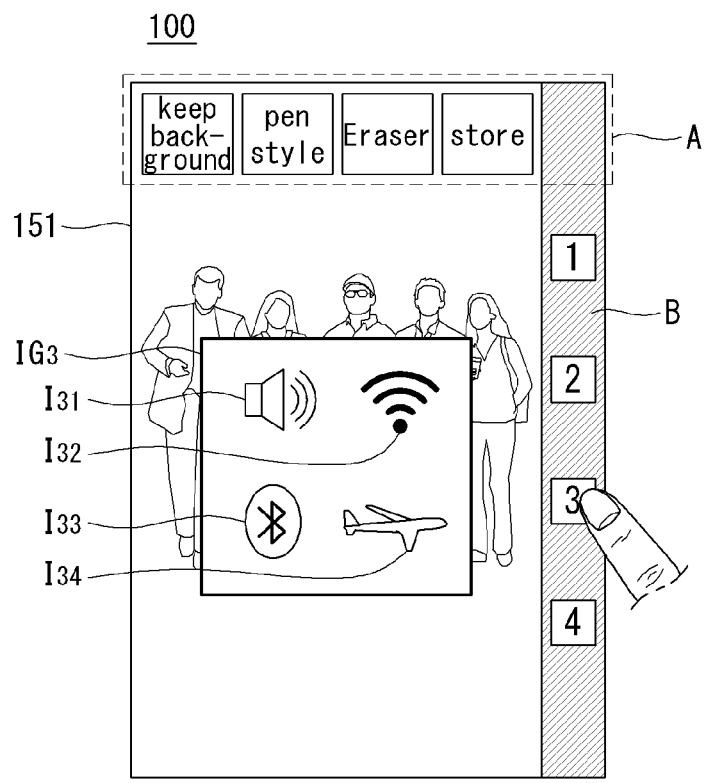

Referring to FIG. 8, the third item group 3 may include control items for controlling statuses (e.g. communication connection status, wireless network connection status, etc.) of the mobile terminal 100. The control items may include WiFi On/Off, BlueTooth On/Off, Airplane Mode On/Off, etc. In addition, the controller 180 can display a pop-up window IG3 of the third item group and a plurality of items 131, 132, 133 and 134 included in the pop-up window IG3 on the touchscreen 151.

Items that are provided through the layer B and can be linked with a memo in the memo mode of the mobile terminal 100 have been described. A description will be given of an example of a process of linking a memo generated in the memo mode with a specific item and an operation of the mobile terminal 100 when the memo linked with the specific item is executed.

Figure 9:
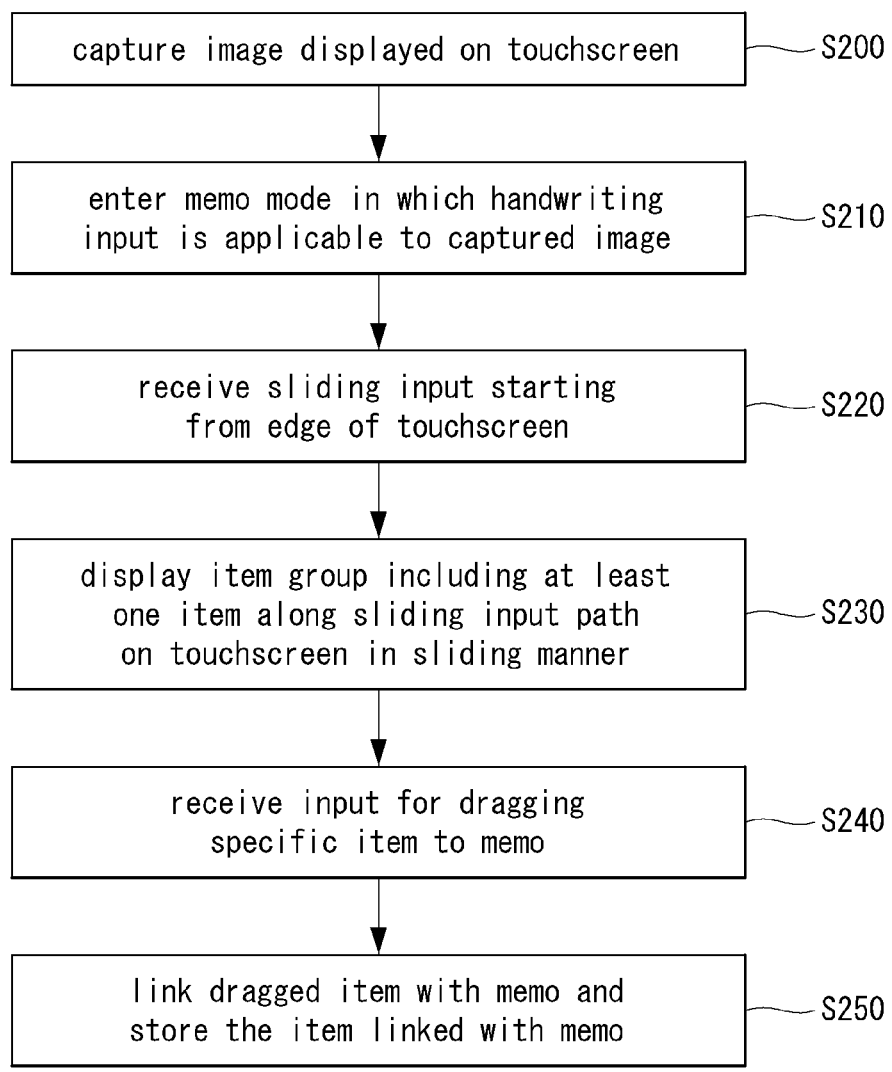
FIG. 9 is a flowchart illustrating the first embodiment of the present invention in more detail.

FIG. 9 is a flowchart illustrating the method of controlling the mobile terminal according to the first embodiment of the present invention in more detail.

Referring to FIG. 9, the controller 190 can capture an image displayed on the touchscreen 151 through a predetermined input (e.g. input through a hard key included in the body of the mobile terminal or input through a soft key on the touchscreen 151) (S200).

The controller 180 can enter the memo mode in which the user can apply handwriting input to the captured image (S210).

In addition to the method of recognizing a captured image as a memo upon reception of a predetermined input, the controller 180 may display a new memo to which handwriting input can be applied on the touchscreen 151. A target recognized as the memo is not limited to the above-described example. In the following description, a captured image of an image displayed on the touchscreen 151 is exemplified as the memo to which handwriting input can be applied.

The controller 180 can receive a sliding input starting at the edge of the touchscreen 151 (S220). The controller 180 can display an item group including at least one item along the path of the sliding input on the touchscreen 151 (S230). The item group can be included in the layer B and displayed as described above.

The controller 180 can receive an input for dragging a specific item from among the item group to the generated memo (S240). The controller 180 can link the specific item with the memo and store the item linked with the memo (S250).

The controller 180 can enter the memo mode during execution of a specific application. In this case, handwriting input can be applied to the execution screen of the specific application, linked with a specific item from among the item group and stored. Upon execution of the memo linked with the specific item, the controller 180 can apply the generated memo to execution of the item.

FIGS. 10 to 13 are views illustrating an operation of the mobile terminal when a path finding application is linked with a memo.

Figure 10:
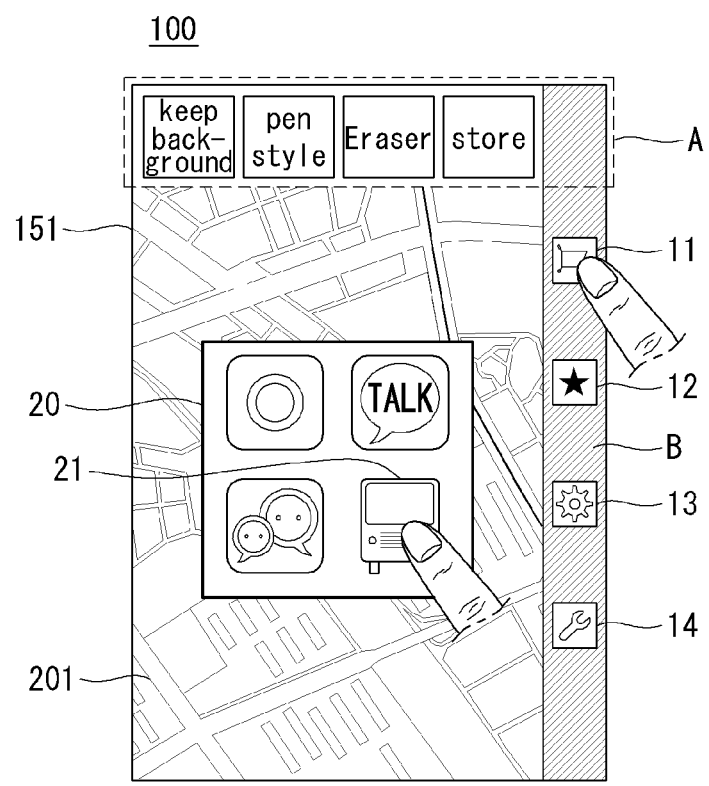
FIGS. 10 to 13 are views illustrating an operation of the mobile terminal when a path finding application is linked with a memo.

Referring to FIG. 10, the controller 180 can capture a map 201 displayed on the touchscreen 151 and the user can apply handwriting input to the captured map 201 in the memo mode during execution of a map application. The controller 180 can display the current location of the mobile terminal 100 on the map. The controller 180 may enter the memo mode while the current location of the mobile terminal 100 is displayed on the map.

In this case, the generated memo may be a map image including the current location of the mobile terminal 100, displayed on the map.

Upon reception of a predetermined touch input in the memo mode, the controller 180 can display the layer B including one or more item groups 11, 12, 13 and 14 on the touchscreen 151 in a sliding manner.

Upon reception of an input for selecting a path finding application 21 from the first item group 11, the controller 180 can link the path finding application 21 with the map image 201 recognized as the memo.

Figure 11:
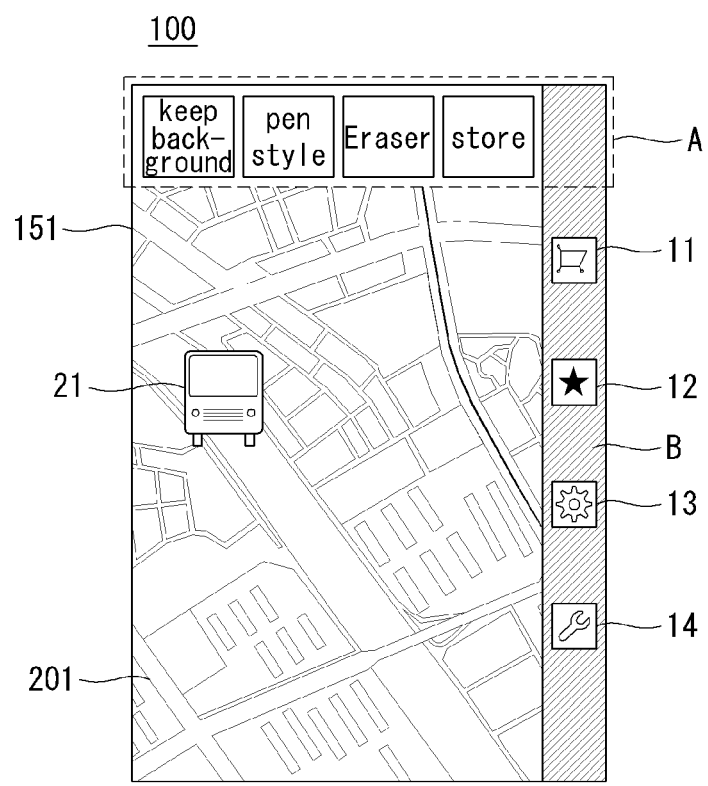

Referring to FIG. 11, the path finding application 21 is displayed on the map image 201, and thus the user can recognize that the path finding application 21 is linked with the memo. Here, the memo corresponds to the map image 201, as described above. According to an embodiment of the present invention, when the memo is generated according to handwriting input of the user and the mobile terminal 100 enters the memo mode while the execution screen of a specific application is displayed on the touchscreen 151, the controller 180 can recognize the execution screen of the specific application as a memo and also recognize handwriting input of the user applied to the execution screen of the specific application as a memo.

Figure 12:
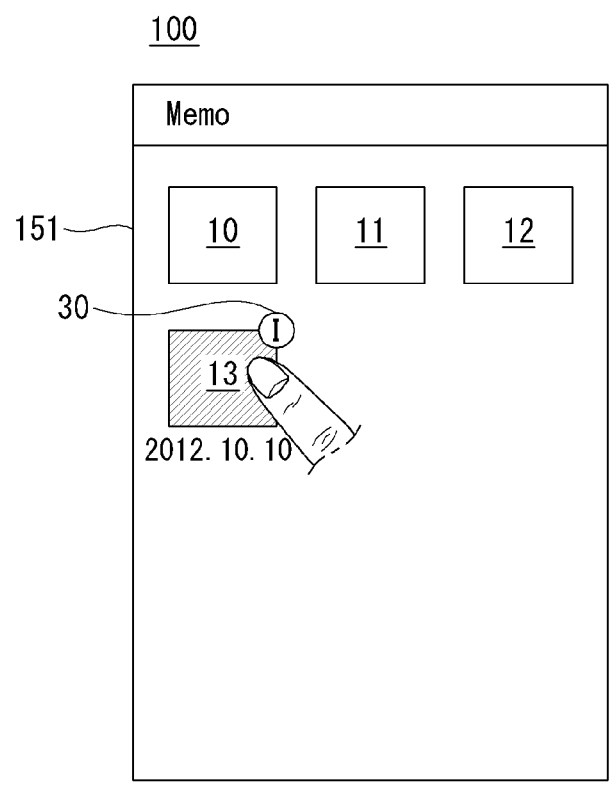

Referring to FIG. 12, the memo linked with the specific item can be stored in the memory (160 of FIG. 1). In this case, the controller 180 can display the memo 13 linked with the specific item along with a predetermined identifier 30 to discriminate the memo 13 from other memos 10, 11 and 12. The predetermined identifier 30 may have a predetermined graphical user interface (GUI) to identify the item linked with the memo. For example, when the item linked with the memo is the path finding application, a GUI having a shape indicating navigation can be displayed with the memo.

Figure 13:
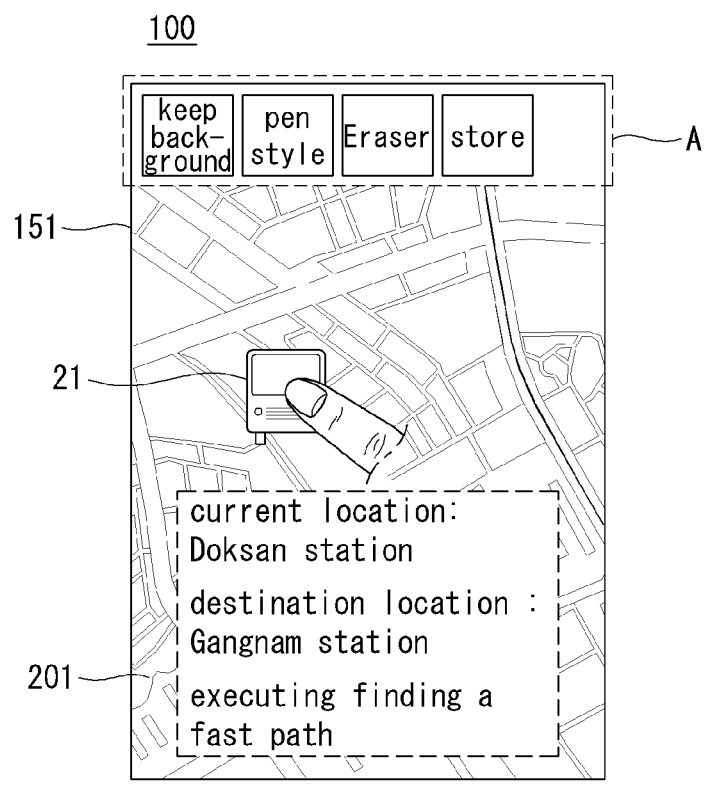

The memo linked with the item can be executed again. For example, when the memo is executed, the path finding application 21 can be displayed with the memo 201, as shown in FIG. 13.

Upon reception of touch input for selecting the path finding application 21, the controller 180 can execute a navigation function of navigating a route to the location of the mobile terminal 100, which is stored when the memo is generated.

The memo linked with the path finding application 21 can be shared with an external device. That is, when a mobile terminal that receives the memo linked with the path finding application 21 executes the memo, the memo and the path finding application 21 linked with the memo can be displayed on the display of the mobile terminal receiving the memo. When the mobile terminal receiving the memo selects the path finding application, the path finding application can be executed to provide a route to the location of the mobile terminal transmitting the memo, which is stored when the memo is generated.

Figure 14:
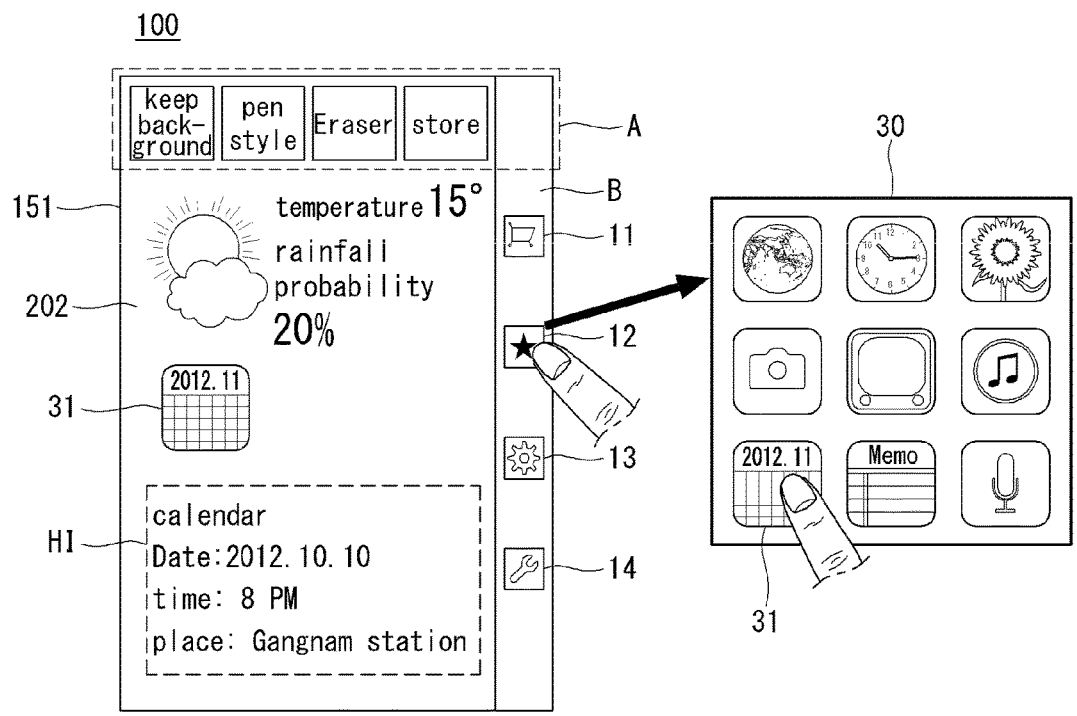
FIGS. 14 and 15 are views illustrating an operation of the mobile terminal when a calendar application is linked with a memo.
Figure 15:
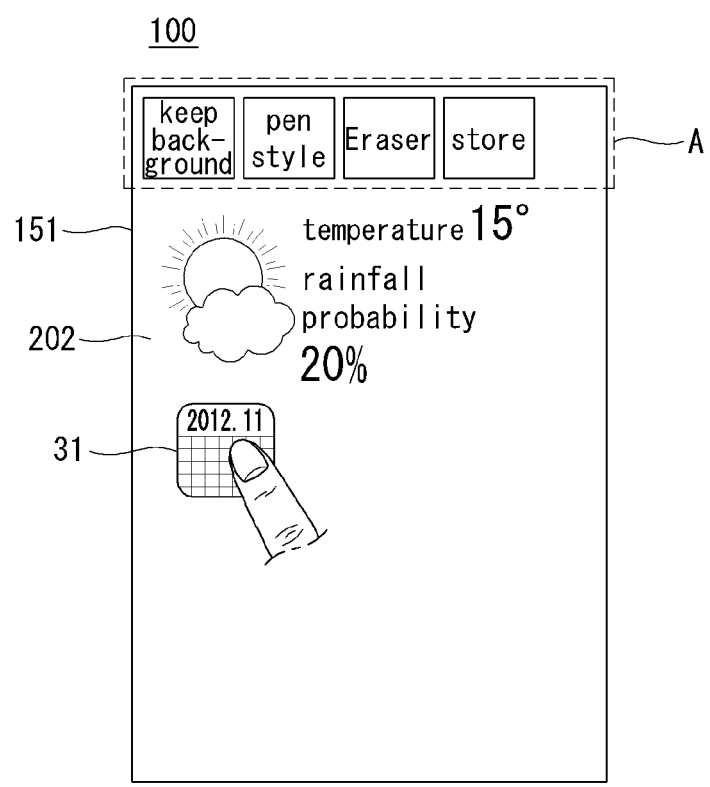

FIGS. 14 and 15 are views illustrating an operation of the mobile terminal when a calendar application is linked with a memo.

Referring to FIGS. 14 and 15, the mobile terminal may enter the memo mode while the execution screen of a specific application (e.g. weather report application execution screen 202) is displayed on the touchscreen 151.

The controller 180 can recognize the execution screen 202 of the specific application as a memo. The user may apply handwriting input to the memo. Upon reception of an input of dragging a calendar application 31 from among the second item group 12 to the memo, the controller 180 can display an input window HI to which schedule information is input on the memo 202. Then, the schedule information can be stored in a schedule application of the mobile terminal 100.

When the memo linked with the calendar application 31 is transmitted to an external terminal, the schedule information stored in the calendar application 31 is added to a calendar of the external terminal upon execution of the memo by the external terminal.

Figure 16:
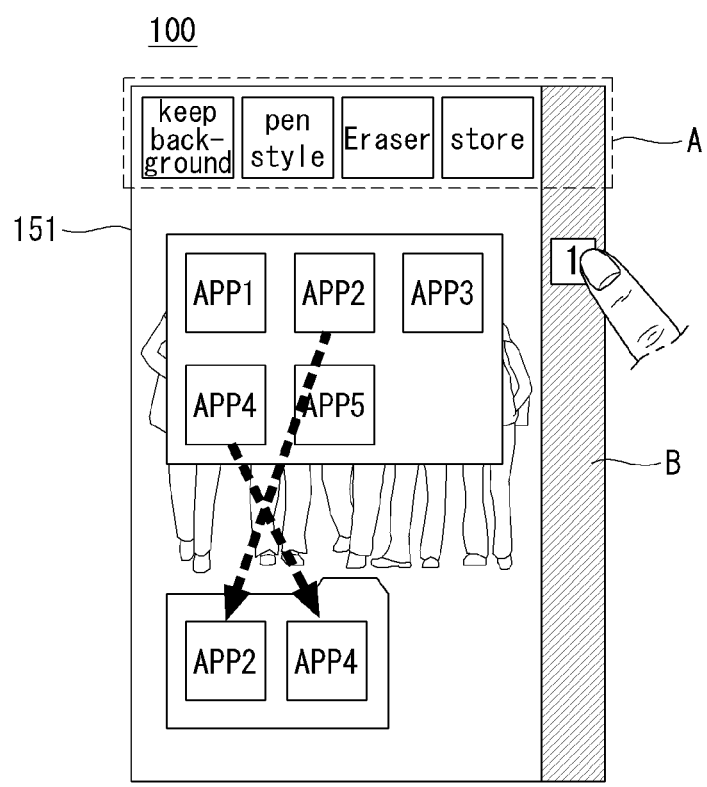
FIG. 16 illustrates an example of recommending a plurality of applications to a memo recipient through a memo.

FIG. 16 is a view illustrating an example of recommending a plurality of applications to a memo recipient through a memo. The example illustrated in FIG. 16 recommends an application linked with a memo to at least one external device by sharing the application with the external device.

Referring to FIG. 16, when one or more applications app2 and app4 are linked with a generated memo, the applications app2 and app4 can be included in a folder and arranged. The controller 180 can store the generated memo with the applications.

The controller 180 can transmit the stored memo to an external device that will share the memo. When the applications linked with the memo are not stored in the external device, the controller 180 can transmit a control signal for recommending the applications to the external device along with the memo.

FIG. 17 is a view illustrating an operation of the mobile terminal when a calculator application 41 is linked with the memo. Referring to FIG. 17, the controller 180 can link the calculator application 41 with a memo 203 and store the memo 203 linked with the calculator application 41. Upon execution of the calculator application 41, a user interface 42 corresponding to a calculator function can be displayed on the memo 203.

According to an embodiment of the present invention, when a generated memo is linked with a predetermined item and stored, it is not necessary to finish the memo in order to execute the item. Accordingly, utilization of a memo input to the mobile terminal 100 can be improved.

Figure 18:
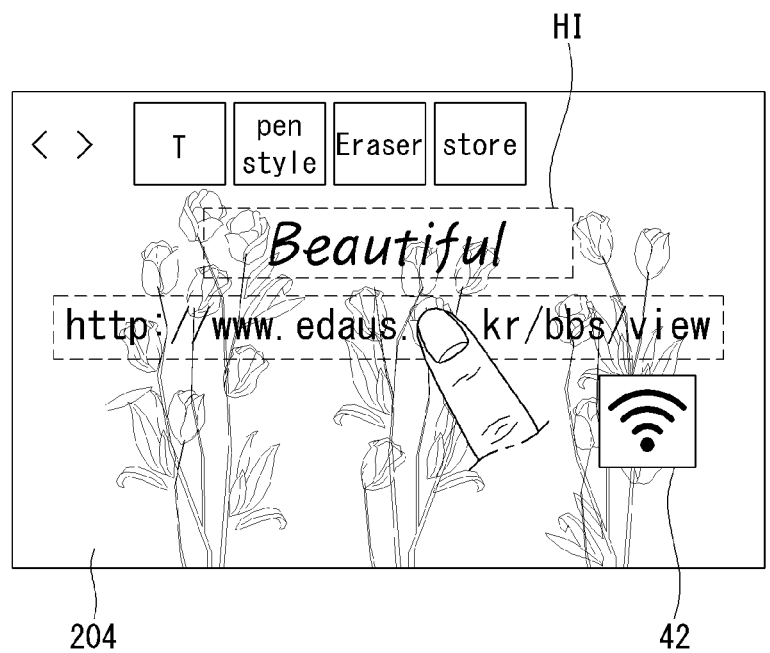
FIG. 18 is a view illustrating an operation of the mobile terminal when a control item for controlling the operation of the mobile terminal is linked with a memo.

FIG. 18 is a view illustrating an operation of the mobile terminal when a control item for controlling the operation of the mobile terminal is linked with a memo.

Referring to FIG. 18, when a predetermined webpage address is input to a memo 204, a control item for setting Wi-Fi can be linked with the memo 204. Accordingly, the controller 180 can display an icon 42 representative control item for setting Wi-Fi on the memo 204.

Upon selection of the icon 42 for setting Wi-Fi, a screen for setting a wireless network of the mobile terminal 100 can be displayed on the touchscreen 151. The screen for setting a wireless network can be overlaid on the memo 204.

When a terminal receiving the memo executes the memo, wireless network setting can be automatically monitored and, when Wi-Fi is not set, the screen for setting Wi-Fi can be displayed, being overlaid on the memo.

Figure 19:
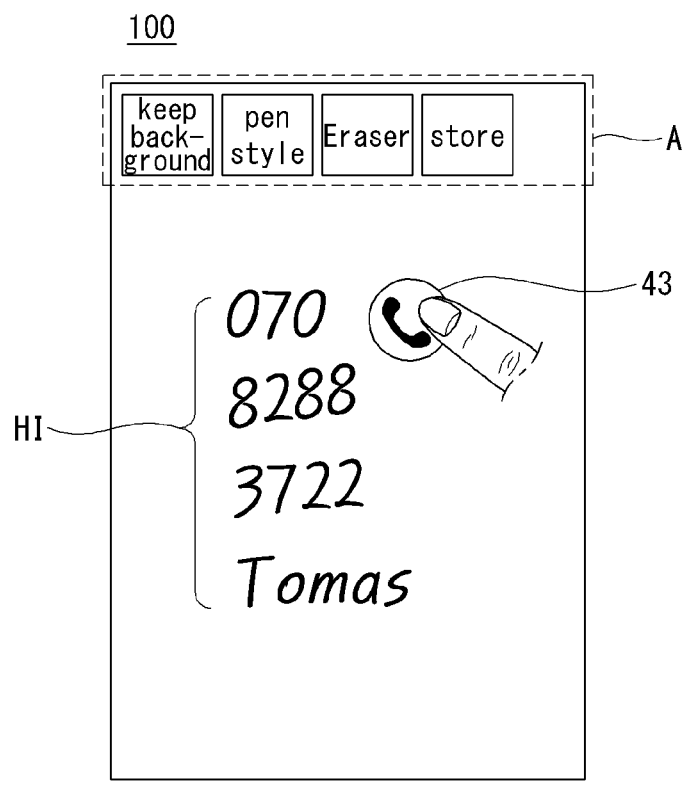
FIG. 19 is a view illustrating an operation of the mobile terminal when a call application is linked with a memo on which a predetermined phone number is written.

FIG. 19 is a view illustrating an operation of the mobile terminal when a predetermined phone call is written on a memo and a call application is linked with the memo.

Referring to FIG. 19, the controller 180 can display a memo for handwriting input on the touchscreen 151 in the memo mode. The user can apply handwriting input HI to the memo. The controller 180 can link a call function item 43 with the memo.

Upon selection of the call function item 43, the controller 180 can recognize characters by applying a predetermined character recognition algorithm to the handwriting input HI (phone number) and use the recognized characters (phone number) to connect a call. However, items that can be linked with the memo are not limited to the call function item. For example, the items that can be linked with the memo can include a text message application, e-mail application, etc.

Figure 20:
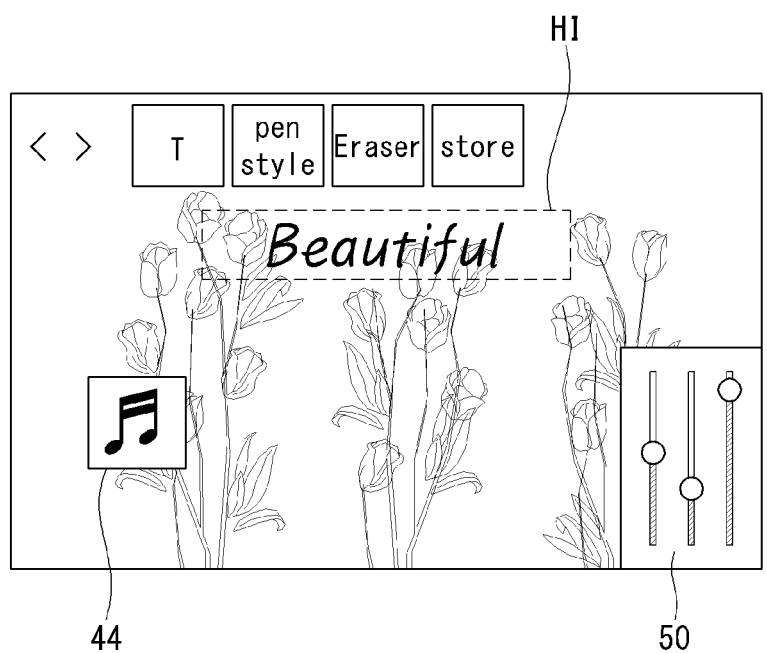
FIG. 20 is a view illustrating an operation of the mobile terminal when a music file is linked with a memo.

FIG. 20 is a view illustrating an operation of the mobile terminal when a predetermined music file is linked with a memo. Referring to FIG. 20, predetermined background music is linked with a memo. To achieve this, the user can link a music file 44 stored in the memory (160 of FIG. 1) with the memo. Upon selection of the music file 44, the controller 180 can execute the music file and display a volume control window 50 for controlling the volume of the music file on the touchscreen 151.

According to the above-described embodiments, a predetermined item can be linked with a memo generated in the mobile terminal 100 and the memo can be applied to execution of the item to improve utilization of the memo.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a touchscreen;
   a memory; and
   a controller configured to:
      receive a handwriting input via the touchscreen in a memo mode;
      generate a memo including the received handwriting input and cause the touchscreen to display the generated memo;
      cause the touchscreen to display a plurality of application group icons in response to a first touch input, wherein each of the plurality of application group icons correspond to one or more applications that are linkable with the generated memo;
      cause the touchscreen to display a first plurality of application icons in a first region of the touchscreen in response to an input to a first displayed application group icon of the plurality of application icons, wherein the first displayed application group icon corresponds to the first plurality of application icons;
      link the generated memo with a selected application in response to a touch drag input dragging a displayed selected application icon from the first region to a drag termination location in a second region where the generated memo is displayed;
      cause the touchscreen to display the generated memo along with display of the selected application icon at the drag termination location in the second region;
      cause the memory to store the generated memo to be linked with the selected application;
      execute the selected application in response to an input for selecting the displayed selected application icon while the generated memo is displayed; and
      cause the touchscreen to display a memo icon corresponding to the stored memo, the memo icon comprising a visual indicator indicating a link with the selected application;
      execute the stored memo in response to a selection of a displayed memo icon;
      cause the touchscreen to display the generated memo and the selected application icon at the drag termination location in the second region; and
      execute the selected application in response to an input for selecting the displayed selected application icon while the generated memo is displayed.

2. The mobile terminal of claim 1, wherein the at least one application icon comprises icons corresponding to a call application, a message application icon, or an e-mail application.

3. The mobile terminal of claim 2, wherein:
   the selected application icon corresponds to the call application, the message application, or the e-mail application; and
   information of the generated memo is used to enter a phone number in the executed call application, enter a message content of the executed message application, or enter an e-mail message content of the executed e-mail application.

4. The mobile terminal of claim 1, wherein the controller is further configured to cause the touchscreen to display:
   at least one handwriting function object each corresponding to a respective function to alter a characteristic of the received handwriting input; and the received handwriting input with an altered characteristic in response to a touch input selecting one of the at least one handwriting function object.

5. The mobile terminal of claim 1, wherein the plurality of application group icons comprise icons corresponding to:
a first application added by a user and downloaded from an external server and stored in the memory;
a second application pre-stored in the memory of the mobile terminal; or
a third application for controlling operations of the mobile terminal.

6. The mobile terminal of claim 1, wherein the generated memo comprises web link information and the selected application corresponds to a network settings menu for changing a setting of a wireless network connection.

7. A method of controlling a mobile terminal, the method comprising:
receiving a handwriting input via a touchscreen of the mobile terminal in a memo mode;
generating a memo including the received handwriting touch input and displaying the generated memo;
displaying a plurality of application group icons in response to a first touch input, wherein each of the plurality of application group icons correspond to one or more applications that are linkable with the generated memo;
displaying a first plurality of application icons in a first region of the touchscreen in response to an input to a first displayed application group icon of the plurality of application icons, wherein the first displayed application group icon corresponds to the first plurality of application icons;
linking the generated memo with a selected application in response to a touch drag input dragging a displayed selected application icon from the first region to a drag termination location in a second region where the generated memo is displayed;
displaying the generated memo along with display of the selected application icon at the drag termination location in the second region;
storing the generated memo to be linked with the selected application;
executing the selected application in response to an input for selecting the displayed selected application icon while the generated memo is displayed;
displaying a memo icon corresponding to the stored memo, the memo icon comprising a visual indicator indicating a link with the selected application;
executing the stored memo in response to a selection of a displayed memo icon;
displaying the generated memo and the selected application icon at the drag termination location in the second region; and
executing the selected application in response to an input for selecting the displayed selected application icon while the generated memo is displayed.

8. The method of claim 7, wherein the plurality of application group icons comprise icons corresponding to:
a first application added by a user and downloaded from an external server and stored in the memory;
a second application pre-stored in the memory of the mobile terminal; or
a third application for controlling operations of the mobile terminal.

9. The method of claim 7, further comprising displaying at least one handwriting function object each corresponding to a respective function to alter a characteristic of the received handwriting input.

10. The method of claim 7, wherein the at least one application icon comprises icons corresponding to a call application icon, a message application icon, or an e-mail application.

11. The method of claim 7, wherein the generated memo comprises web link information and the selected application corresponds to a network settings menu for changing a setting of a wireless network connection.

* * * * *